UNITED STATES PATENT OFFICE.

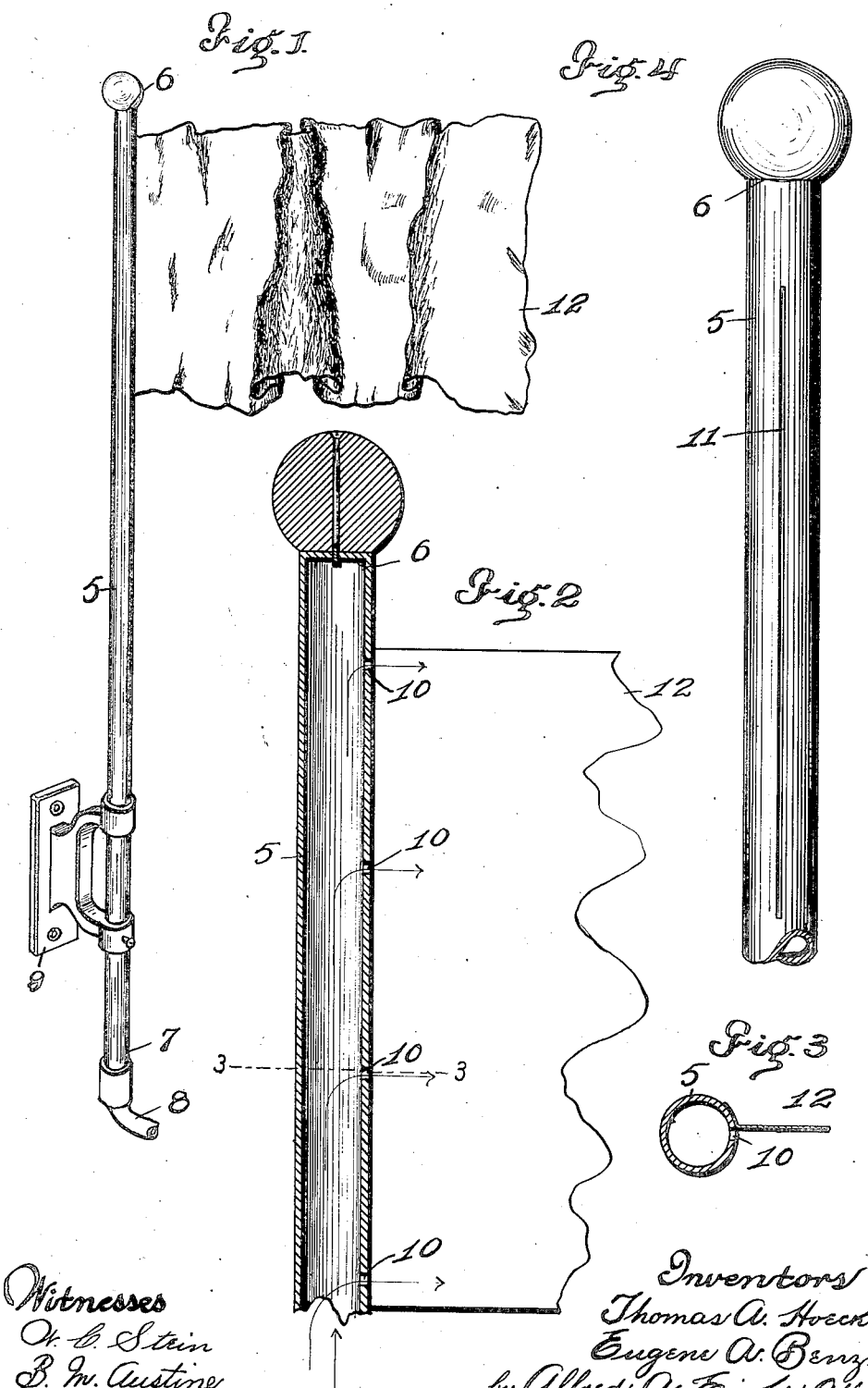

THOMAS A. HOECKER AND EUGENE A. BENZ, OF ST. LOUIS, MISSOURI.

NOVELTY FOR ADVERTISING AND OTHER PURPOSES.

1,131,699.  Specification of Letters Patent.  Patented Mar. 16, 1915.

Application filed December 10, 1913. Serial No. 805,717.

*To all whom it may concern:*

Be it known that we, THOMAS A. HOECKER and EUGENE A. BENZ, citizens of the United States, and residents of St. Louis, Missouri, have invented certain new and useful Improvements in Novelties for Advertising and other Purposes, of which the following is a specification.

Our invention relates to improvements in a novelty for advertising and other purposes, and has for its object a hollow flag staff which is provided with air outlets through which air is directed against a pliant body, such as a flag, banner, pennant or the like, so that the body is unfurled and held in a waving position.

A further object of our invention is to provide a hollow staff the same being provided with a pliant body of thin durable material, and an air passage formed in the staff in close proximity to the body, such passage being in the form of perforations or slots, so that air under pressure is directed against the body placing the same in a waving position, the device being used in show windows, halls, coliseum or other places where the natural air or breeze is prevented from contacting with the body, in order that said body may be in a continuous waving position.

Figure 1, is a perspective view of our invention, showing the same in supported operative position. Fig. 2, is a vertical sectional view of the upper portion of our invention. Fig. 3, is a horizontal sectional view taken on the line 3—3 of Fig. 2. Fig. 4, is a detail side elevation of the upper portion of the staff showing a modified form of air outlet.

In the construction of our invention we provide a hollow staff 5, the upper end 6, being closed, and to the bottom open end 7, may be attached a flexible or rigid tube 8, which leads to and connects with an ordinary air producing device, such as a blower and which blower may be positioned at any convenient place preferably out of sight of the observer. The staff may be supported in a bracket as that indicated by the numeral 9, or it may be supported in any other suitable manner depending upon the position and location. The upper portion of the staff is provided with a plurality of air outlets 10, either in the form of perforations or a narrow elongated slot 11, as that shown in Fig. 4.

On the staff and secured thereto in any desirable manner, is placed a body 12, of pliant material, such as a flag, banner, pennant or any other device which is of such material as to be blown approximately at right-angles to the staff and placed in a waving position by means of the air passing through the staff and through the outlets directed against the body; by this arrangement the body is continuously held in a waving position, the same as an ordinary flag when unfurled to the breeze.

The essential feature of our invention is the hollow staff having air outlets directed against a pliant body.

Having fully described our invention what we claim is:

1. A novelty for advertising and other purposes comprising a hollow staff, a pliant body attached thereto, said staff having outlets through which air is directed under pressure in direct lines against the body.

2. A novelty for advertising and other purposes comprising a hollow staff, a body of pliant material, said staff having air outlets formed in itself in proper relation with the pliant body through which air is directed against the body in direct lines longitudinal with said body to keep the same in a waving position, and a tube connected to the hollow staff through which air is admitted to said staff from any source of supply, substantially as specified.

3. A device of the class described comprising a hollow staff the upper end thereof being closed, a body of pliant material attached to a portion of the hollow staff; a plurality of apertures formed in said staff at that portion to which the pliant body is attached for directing air under pressure against said body, and brackets for supporting the staff, substantially as specified.

In testimony whereof, we have signed our names to this specification, in presence of two subscribing witnesses.

THOMAS A. HOECKER.
EUGENE A. BENZ.

Witnesses:
ALFRED A. EICKS,
WALTER C. STEIN.